US012624427B2

(12) United States Patent
Ulrik

(10) Patent No.: US 12,624,427 B2
(45) Date of Patent: May 12, 2026

(54) 3D PRINTED HIGH CARBON CONTENT STEEL AND METHOD OF PREPARING THE SAME

(71) Applicant: VBN Components AB, Uppsala (SE)

(72) Inventor: Beste Ulrik, Björklinge (SE)

(73) Assignee: VBN Components AB, Uppsala (SE)

( * ) Notice: Subject to any disclaimer, the term of this patent is extended or adjusted under 35 U.S.C. 154(b) by 625 days.

(21) Appl. No.: 17/423,604

(22) PCT Filed: Jan. 20, 2020

(86) PCT No.: PCT/SE2020/050047
§ 371 (c)(1),
(2) Date: Jul. 16, 2021

(87) PCT Pub. No.: WO2020/149787
PCT Pub. Date: Jul. 23, 2020

(65) Prior Publication Data
US 2022/0105568 A1 Apr. 7, 2022

(30) Foreign Application Priority Data

Jan. 18, 2019 (SE) .................................... 1950064-4
Oct. 17, 2019 (SE) .................................... 1951174-0

(51) Int. Cl.
*C22C 33/02* (2006.01)
*B22F 5/00* (2006.01)
(Continued)

(52) U.S. Cl.
CPC .......... *C22C 33/0292* (2013.01); *B22F 10/28* (2021.01); *B22F 10/64* (2021.01); *B22F 10/66* (2021.01); *B33Y 40/20* (2020.01); *B33Y 80/00* (2014.12); *C22C 38/22* (2013.01); *C22C 38/24*

(2013.01); *C22C 38/30* (2013.01); *C22C 38/36* (2013.01); *B22F 2005/001* (2013.01); *B22F 2005/002* (2013.01); *B22F 10/32* (2021.01);
(Continued)

(58) Field of Classification Search
CPC ..... C22C 33/0292; C22C 38/22; C22C 38/24; C22C 38/30; C22C 38/36; B33Y 80/00; B33Y 40/20; B33Y 10/00; B22F 10/66; B22F 10/64; B22F 10/28; B22F 10/32; B22F 2005/001; B22F 2005/002; B22F 2201/20; B22F 2301/35
USPC ........................................................ 148/513
See application file for complete search history.

(56) References Cited

U.S. PATENT DOCUMENTS 5,063,116 A 11/1991 Uchida

FOREIGN PATENT DOCUMENTS

DE 38 30 112 A1 3/1990
EP 0452550 A1 10/1991
(Continued)

OTHER PUBLICATIONS

English language machine translation of JP-01152242-A. Generated May 15, 2024. (Year: 2024).*
(Continued)

*Primary Examiner* — Ricardo D Morales
(74) *Attorney, Agent, or Firm* — Faegre Drinker Biddle & Reath LLP

(57) ABSTRACT
A 3D printed product of an iron based alloy having a narrow distribution of carbide areas is disclosed, as well as a method of preparing the product where the HIP and hardening is combined.

8 Claims, 7 Drawing Sheets

(51) Int. Cl.

| | | |
|---|---|---|
| *B22F 10/28* | (2021.01) | |
| *B22F 10/32* | (2021.01) | |
| *B22F 10/64* | (2021.01) | |
| *B22F 10/66* | (2021.01) | |
| *B33Y 10/00* | (2015.01) | |
| *B33Y 40/20* | (2020.01) | |
| *B33Y 80/00* | (2015.01) | |
| *C22C 38/22* | (2006.01) | |
| *C22C 38/24* | (2006.01) | |
| *C22C 38/30* | (2006.01) | |
| *C22C 38/36* | (2006.01) | |

(52) U.S. Cl.
CPC ....... *B22F 2201/20* (2013.01); *B22F 2301/35* (2013.01); *B33Y 10/00* (2014.12)

(56) References Cited

FOREIGN PATENT DOCUMENTS

| EP | 2361704 | A1 | * | 8/2011 | ............ | B22F 3/1055 |
|---|---|---|---|---|---|---|
| EP | 2 952 275 | A1 | | 12/2015 | | |
| JP | 01152242 | A | * | 6/1989 | | |
| JP | H0266139 | A | | 3/1990 | | |
| JP | 2689486 | B2 | * | 12/1997 | | |
| KR | 10-1991-0016492 | A | | 11/1991 | | |
| KR | 2013 0115879 | A | | 10/2013 | | |
| WO | WO-0026427 | A1 | | 5/2000 | | |
| WO | WO-2016/055098 | A1 | | 4/2016 | | |
| WO | WO-2018/169477 | A1 | | 9/2018 | | |
| WO | 2019/103686 | A1 | | 5/2019 | | |

OTHER PUBLICATIONS

Pinnow et al. "P/M Tool Steels." ASM Handbook, vol. 1: Properties and Selection: Irons, Steels, and High-Performance Alloys. pp. 780-792. 1990. (Year: 1990).*

Kempton. "A Design Sociotechnical Making of 3D Printing." Additive Manufacturing: Design, Methods, and Processes. pp. 21-73. 2017 (Year: 2017).*

"What is D90." Aim Sizer Solutions. https://www.aimsizer.com/faqs-what-is-d90.html. 2024. (Year: 2024).*

English language machine translation of JP-2689486-B2. Generated 2025. (Year: 2025).*

Office Action from the Korean Intellectual Property Office for Application No. 10-2021-7025796 dated Dec. 6, 2024, 11 pages.

* cited by examiner

Wear volume (mm3)

Sliding distance (m)

X  Wear volume (mm3) Material 280-4          ♦  Wear volume (mm3) Material 280-5

Carbide size

3D PRINTED HIGH CARBON CONTENT STEEL AND METHOD OF PREPARING THE SAME

CROSS REFERENCE TO RELATED APPLICATIONS

This application is a National Stage of International Application No. PCT/SE2020/050047 filed Jan. 20, 2020, which claims benefit of Swedish Patent Application No. 1950064-4 filed Jan. 18, 2019 and Swedish Patent Application No. 1951174-0 filed Oct. 17, 2019, all of which are herein incorporated by reference in their entirety.

FIELD OF THE INVENTION

The present invention relates to 3D printed products of an iron based alloy with high hardness. The 3D printed products are hardened using a furnace in which the product obtained from 3D printing is treated during Hot Isostatic Pressure (HIP) and quenched.

BACKGROUND

Today, when producing Powder Metallurgy materials, there exists a number of different techniques. One of the major methods is PM-HIP; Powder Metallurgy Hot Isostatic Pressing. The technique is to atomise (granulate) a metal powder, putting this powder into a container, sealing this container, and expose the sealed container for HIP, for example according to the standard process, at 1120-1150° C., at 100 MPa in typically 3 hours. The result is a consolidated material block which typically needs to be further processed.

The container can be of different shapes, highly dependent on the material and the shape needed for the final part. It can also be a standard cylinder shape, if the material is going to become a bar for further production.

In the latter case, for example for production of PM-HSS (powder metallurgy high speed steels) the material block is then typically forged and rolled to final bar dimensions. These bars are then typically soft annealed and then transported to a stock. Later on, they are transported to a workshop where the soft machining is done, for shape of the wanted detail such as a gear hob. However, after the soft machining, the gear hob blanks are hardened in a vacuum furnace and then tempered in another furnace. And finally, the hardened blanks could be ground to achieve the wanted tolerance of the surfaces.

Typically, after machining of a soft annealed steel bar, hardening of the material is performed. One of the most common hardening process for PM-HSS is heating up to 1180° C., remain at that temperature for a hold time, and then quench down to 25-50° C. and assuring that the cooling rate minimum is 7° C./s between 1000° C. and 800° C. The hardening is then followed by tempering, where the material is repeatedly heated up to 560° C. with >1 h hold time, and then cooled to <25° C. between the repetitions.

The temperatures are, of course, dependent of type of alloy and the goal for hardness. In addition, a stress revealing step (typically 600-700° C. in 2 h plus slow cooling to 500° C. and then cool down to 25° C.) can be added if heavy soft machining has been done.

The result of the PM-HIP process is, beyond the powder quality, composition, forging and rolling, therefore an effect of temperature, pressure and time.

HIP process can also be utilized on 3D-printed (additive manufactured) metal alloys. The process can then act as a way to close eventual pores from the 3D-printing process. The process will then act to ensure a full density component. After a HIP process of a 3D-printed product, a traditional hardening process can then be used.

The result of 3D-printing, HIP and hardening process is then, in addition to powder quality, composition and 3D-printing parameters, also a result of temperature, pressure and time. Still this multiple step process is time consuming.

SUMMARY OF THE INVENTION

The object of the present invention is to overcome the drawback of prior art. Therefore the present invention provides a method where HIP and hardening are combined and unexpectedly the obtained material had improved mechanical properties in comparison with the traditionally HIP and hardened material. The present invention also aims at providing materials or products having a more homogenous carbide size or carbide area distribution. For example the hardness of the material was improved with up to 12% and the abrasion study revealed a 7.5% lower wear rate. Additionally even though the hardness increased the toughness remained as for traditionally treated samples. This is more pronounced for alloys with higher carbon contents.

In a first aspect the present invention relates to a 3D printed product according to claim 1.

In a preferred embodiment the present invention relates to a 3D-printed product made of an iron based alloy comprising a metal matrix and grains of carbides embedded in the metal matrix;

wherein the alloy comprises

Carbon: equal to or greater than 1.0 and equal to or less than 5.0 weight %;

Chromium: equal to or greater than 2.0 and equal to or less than 22.0 weight %;

Iron: balance;

wherein the alloy further comprises at least two of the elements:

Tungsten: equal to or greater than 2 and equal to or less than 13 weight %,

Cobalt: equal to or greater than 9 and equal to or less than 18 weight %,

Molybdenum: equal to or greater than 1 and equal to or less than 10 weight %, and Vanadium: equal to or greater than 3 and equal to or less than 8 weight %; and wherein the alloy comprises unavoidable trace amount of impurities; and wherein the maximum carbide area is less than 8 $\mu m^2$ and wherein the average carbide area is less than 2 $\mu m^2$; and/or wherein the carbide area distribution has a difference between the d90 value and d10 value of not more than 1.90 $\mu m^2$; and/or wherein the carbide area distribution has a d90 value of not more than 2.20 $\mu m^2$.

In a second aspect the present invention relates to a method of preparing a 3D-printed product comprising a. providing a powder of an iron based alloy wherein the iron based alloy further comprises carbon and unavoidable amounts of impurities;

b. 3D printing a product from the iron based alloy in a free forming apparatus having a chamber wherein the 3D printing is performed in vacuum; and c. treating the obtained product in step b by
   i. placing the product in a furnace;
   ii. heating the product to a first temperature of at least 850° C., increasing the pressure in the furnace to a first pressure of at least 80 MPa and keeping the product at the first temperature and pressure during a first hold time;
   iii. heating the product to a second temperature of at least 950° C. and keeping the product at the second temperature and at a second pressure during a second hold time;
   iv. quenching the product to a third temperature and reducing the pressure in the furnace to a third pressure, and keeping the product at the third temperature and pressure for a third hold time; and
   v. performing a temperature cycle by heating the product to a fourth temperature and increasing the pressure in the furnace to a fourth pressure and keeping the product at the fourth temperature and pressure for a fourth hold time, followed by lowering the temperature of the product to a fifth temperature.

In a third aspect the present invention relates to a product obtained by the method of the present invention.

In one embodiment the product obtained by the present method is preferably obtained by a method wherein the first temperature is 1120-1150° C. and the first pressure is around 100 MPa. Preferably the first hold time is preferably 3 h.

In another embodiment the product obtained by the present method has a hardness measured using a 2 kg Vickers indenter on grinded and polished samples by standard material analysis method with final grinding with SiC P4000, according to SS-EN ISO 6507.

An advantage of the present invention is that the obtained product has at least 5% higher hardness (HV2 kg) than a corresponding 3D printed product treated using conventional HIP and heat treatment, preferably 7% higher hardness, and more preferably 10% higher hardness.

All embodiments described herein are applicable to all aspects unless stated otherwise. Preferred embodiments of the present invention are defined in the dependent claims.

DETAILED DESCRIPTION OF THE INVENTION

Figure 1:
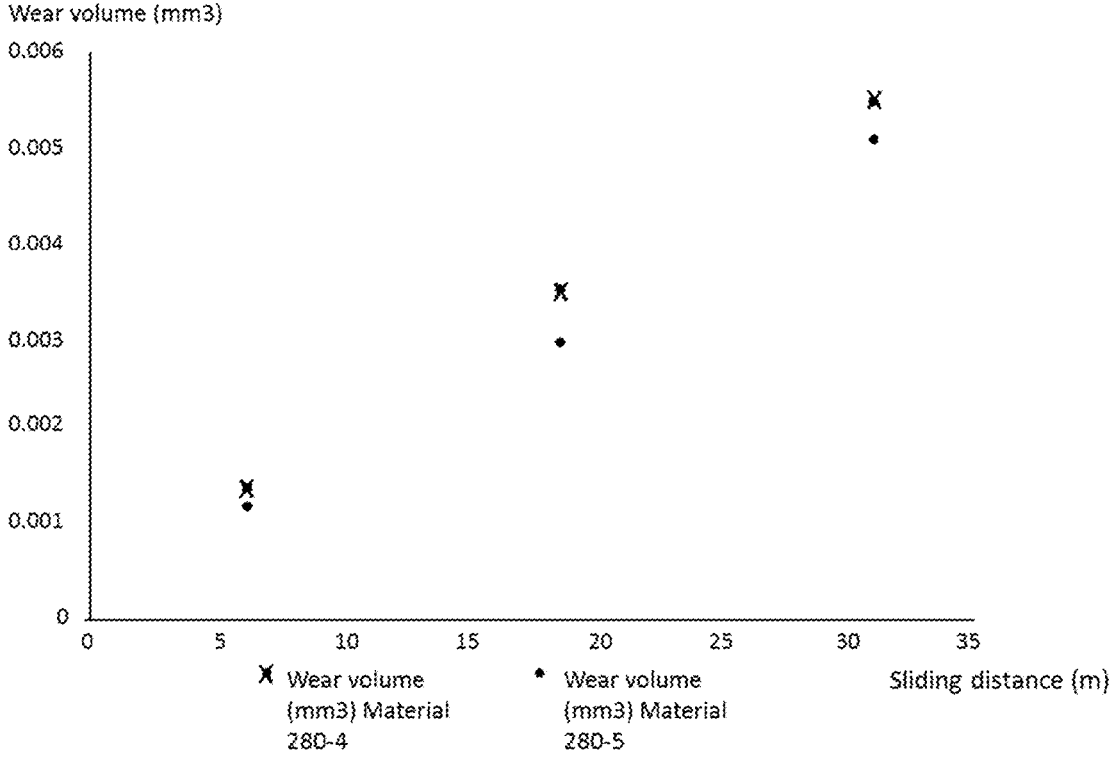
FIG. 1, Abrasion wear rates for Material 280 with different heat treatments. The figure shows the surprisingly low wear volume of Material 280-5 after combined HIP and hardening treatment in comparison with Material 280-4 after traditional HIP and heat treatment. Both using the hardening temperature of 1180° C. and a following tempering of 3×1 h at 560° C. At the final sliding distance in the test (31 m), the measured wear rate was 0.0055 mm³ for the 280-4 and 0.0051 mm³ for the 280-5 respectively. This corresponds to a reduction of wear rate of 7.5%.

In the present application the term three-dimensional printing or 3D-printing or free forming or additive manufacturing denotes the same thing and is used interchangeably.

In the present application the term "carbide size" denotes the widest part of a cross sectional area of a carbide or carbide cluster.

In the present application the term "carbide area" denotes the cross sectional area of a carbide.

In the present application the term "carbide cluster area" denotes the cross sectional area of a carbide cluster. A carbide cluster are individual carbides arranged so close to each other that they act as one large carbide.

In the present application the term "average carbide area" denotes the average cross sectional area of carbides.

In the present application the term "average carbide cluster area" denotes the average cross sectional area of carbide clusters.

In the present application the term "maximum carbide area" denotes that a maximum of 10% of the carbides has this area or a larger are, preferably a maximum of 5%, more preferably a maximum of 1%.

In the present application the term "maximum carbide size" denotes that a maximum of 10% of the carbides has this size or a bigger size, preferably a maximum of 5%, more preferably a maximum of 1%.

The 3D-Printed Product

The aim of the present invention is to present a three-dimensional (3D) printed product made of, or comprising, an iron-based alloy having high hardness and has good high temperature properties. The alloy comprises a metal matrix and grains of carbides embedded in the metal matrix. The alloy is based on iron (balance Fe) and comprises carbon and chromium and may further comprise tungsten, cobalt, vanadium, molybdenum and carbon. Preferably the alloy has a very low oxygen content, preferably an oxygen content equal to or less than 100 ppm by weight, more preferably less than 50 ppm by weight.

The alloy of the present invention comprises carbon, chromium and iron (balanced) and at least two of tungsten, cobalt, molybdenum and vanadium. In a preferred embodiment the alloy comprises tungsten, molybdenum and vanadium. In another preferred embodiment the alloy comprises tungsten, cobalt, molybdenum and vanadium.

The chromium (Cr) content is equal to or greater than 2.0 and equal to or less than 22 weight %. In one preferred embodiment the content is 3 to 10 weight %, preferably 3.5 to 4.5 weight %. In another preferred embodiment the chromium content is 18-22 weight %, more preferably around 20 weight %.

The tungsten (W) content is equal to or greater than 2 and equal to or less than 13 weight %. In a preferred embodiment the content of tungsten is 4 to 12 weight %. In one preferred embodiment the content is preferably 6 to 11 weight %.

The cobalt (Co) content is equal to or greater than 9 and equal to or less than 18 weight %. In one embodiment the content is preferably 10 to 17 weight %.

The vanadium (V) content is equal to or greater than 3 and equal to or less than 8 weight %. In one embodiment the content is preferably 4 to 7 weight %.

The molybdenum (Mo) content is equal to or greater than 1 and equal to or less than 10 weight %. In one embodiment the content is preferably 2 to 8 weight %, more preferably 5 to 7 weight %.

The carbon (C) content is equal to or greater than 1.0 and equal to or less than 5.0 weight %. In one embodiment the content is preferably equal to or greater than 1.4 and equal to or less than 3.0, more preferably 2.20 to 2.60 weight %, more preferably 2.30 to 2.50 weight %.

Besides unavoidable impurities the rest of the alloy is iron i.e. Fe balance. The amount of balanced iron depends on the amount of the other components. Typically, the amount of iron is 50-70 weight %, preferably 60-65 weight %. The oxygen content in the 3D printed product should be as low as possible. In the present invention the oxygen content is preferably 30 ppm or less, or 20 ppm or less.

The alloy may further comprise unavoidable amounts of impurities or traces of impurities of other elements. These elements may be but is not limited to niobium, nickel, manganese, silicon, boron, tantalum, or a combination thereof. The total amount of said other elements or impurities is preferably less than 1 weight %, or less than 0.5 weight %, or less than 0.05 weight %.

In a preferred embodiment the alloy comprises

Carbon: equal to or greater than 1.0 and equal to or less than 5.0 weight %;

Chromium: equal to or greater than 2.0 and equal to or less than 22.0 weight %;

Iron: balance;

wherein the alloy further comprises at least two of the elements:

Tungsten: equal to or greater than 2 and equal to or less than 13 weight %,

Cobalt: equal to or greater than 9 and equal to or less than 18 weight %,

Molybdenum: equal to or greater than 1 and equal to or less than 10 weight %, and Vanadium: equal to or greater than 3 and equal to or less than 8 weight %; and wherein the alloy comprises unavoidable trace amount of impurities.

One advantage of the present invention is that it does not require the use of any organic binders or adhesives and therefore the 3D-printed product usually comprises a combined content of iron, vanadium, molybdenum, carbon, tungsten, chromium and cobalt which is equal to or greater than 95 weight %. In one embodiment of the invention the combined content of iron, vanadium, molybdenum, carbon, tungsten, chromium and cobalt is equal to or greater than 97 weight %. Preferably the combined content of iron, vanadium, molybdenum, carbon, tungsten, chromium and cobalt is equal to or greater than 98 weight %. More preferably the combined content of iron, vanadium, molybdenum, carbon, tungsten, chromium and cobalt is equal to or greater than 99 weight %. Most preferably the combined content of iron, vanadium, molybdenum, carbon, tungsten, chromium and cobalt is equal to or greater than 99.9 weight %. In one embodiment of the invention the amount of organic compounds in the 3D-printed product is equal to or less than 0.1 weight %. Preferably, the amount of organic compounds in the 3D-printed product is equal to or less than 0.05 weight %. In one embodiment of the invention the product is essentially free from any organic compounds. The carbon in the product is mainly in form of carbides such as tungsten and chromium carbides, but elemental carbon and elemental tungsten can also be present in the matrix.

Figure 10:
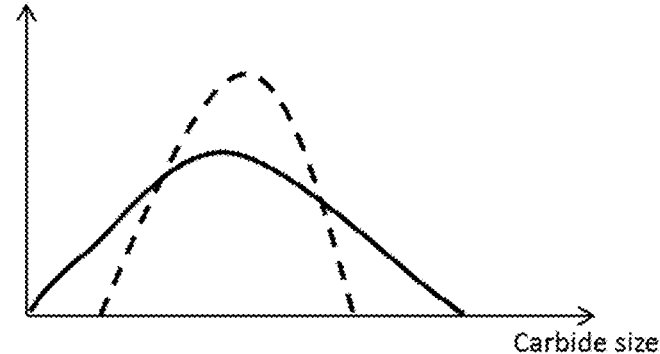
FIG. 10, a schematic illustration of the effect on the carbide area distribution of the present invention (dotted line) in comparison with traditional HIP and hardening (solid line).

The multiphase alloy comprises a matrix of mainly iron, carbon and chromium but may also comprise cobalt, tungsten and/or molybdenum. There are carbides of chromium, vanadium, molybdenum and tungsten, CrC-types, VC and WC or W/Mo$_6$C, present in the matrix. Depending on the alloy composition the carbides of the present invention may mainly be W/Mo$_6$C and VC and the total amount of said carbides is 20-30 volume % preferably 22-28 volume %. The carbides of the 3D printed product are evenly distributed (well dispersed) and the size distribution is narrow as seen in Table 3 and schematically illustrated in FIG. 10 and shown in FIG. 12-14. The matrix may further contain vanadium or nitrogen rich carbide/nitride. The maximum carbide size of the 3D printed hardened product is 10 μm or less. In one embodiment the maximum carbide size is 8 μm or less, 5 μm or less, preferably 3 μm or less. The average carbide size is usually 5 μm or less, or 3 μm or less or 1 μm or less. The average carbide area is preferably 5 μm$^2$ or less, more preferably 2 μm$^2$ or less, even more preferably 1 μm$^2$ or less. In one embodiment the average carbide area is 0.025 μm$^2$ or larger, but preferably 0.25 μm$^2$ or larger. This shows that a narrow carbide size distribution is seen in the products of the present invention. The maximum carbide area is preferably 10 μm$^2$ or less, preferably 8 μm$^2$ or less, or 5 μm$^2$ or less, or 4 μm$^2$ or less. The small carbide size, carbide area and maximum carbide area of the product according to the present invention is partly a result of the method according to the present invention. The carbide area distribution preferably has a d90 value of not more than 2.20 $\mu m^2$, preferably not more than 2.0 $\mu m^2$, more preferably not more than 1.8 $\mu m^2$, more preferably not more than 1.6 $\mu m^2$. In one embodiment the difference between the d90 and the d10 value is not more than 1.90 $\mu m^2$, preferably not more than 1.70 $\mu m^2$ and more preferably not more than 1.50 $\mu m^2$.

Metal compounds that contain carbides sometimes suffer from that carbides forms clusters, stringers, dendritic or net structures which makes the material more brittle. Typically in these types of alloys, especially with high chromium and carbon, chromium forms carbides (such as $Cr_7C_3$ and $Cr_{23}C_6$ but also other stoichiometric types). These carbides typically grow quickly in solidification stage which results in large and long stringers with dimensions from 100-1000 $\mu m$ in size. These large carbides reduce the macro fracture toughness and fatigue resistance in the material. Therefore, one of the advantages of the present invention is that the 3D-product contains carbides or carbide grains that are in general smaller than those found in the prior art and are well-dispersed in the matrix. This is a result of the method according to the present invention.

One advantage of the present invention is the achievement of improved mechanical properties of the 3D-printed product. The hardness of the hardened product (austenitizing at 1180° C., followed by tempering three times at 560° C. for 1 h and then air cooled, the temperature between the temperature stages was below 25° C.) may be at least 1050 HV2 kg (HV2), such as at least 1075 HV2 kg, or at least 1100 HV2 kg, or at least 1125 HV2 kg. In some embodiments the hardness is 1075-1175 HV2 kg or 1100-1150 HV2 kg. The hardness was determined by using a 2 kg Vickers indention (HV2).

Without being bound by theory, the mechanical properties of the present invention are believed to be a result of the fine microstructure of the product. The 3D-printed product is essentially free from dendritic structures of carbides. The carbides are small in size and they are evenly distributed within the matrix as seen in the figures. The alloy of the 3D-printed hardened product usually does not comprise any or only very few carbides having a size equal to or larger than 15 $\mu m$. Instead the average size of the carbides is equal to or less than 10 $\mu m$, or equal to or less than 5 $\mu m$.

Not only does the present invention facilitate the preparation of products and components that have improved mechanical properties, it also makes it possible to prepare products with advanced or complex three-dimensional shapes and forms. The product may comprise cavities, channels or holes and the product may have curved portions or spiral forms. These shapes or forms are prepared without any removal of the alloy besides any optional after treatments. The cavities, holes or channels may be curved, that is to say that their surfaces may be curved, helical or spiral or the like. In some embodiments the product contains cavities where the cavities are sealed or have an opening wherein the diameter or width of the opening is less than the diameter or width of the underlying cavity. The product may be a cutting tool such as a milling cutter, shaper cutter, power skiving cutter, drill, milling tool etc., or a forming tool such as extrusion head, wire drawing die, a hot rolling roll, etc., or wear components such as pumps or valve components, gliding or roll bearing rings, etc.

The Method

Figure 11:
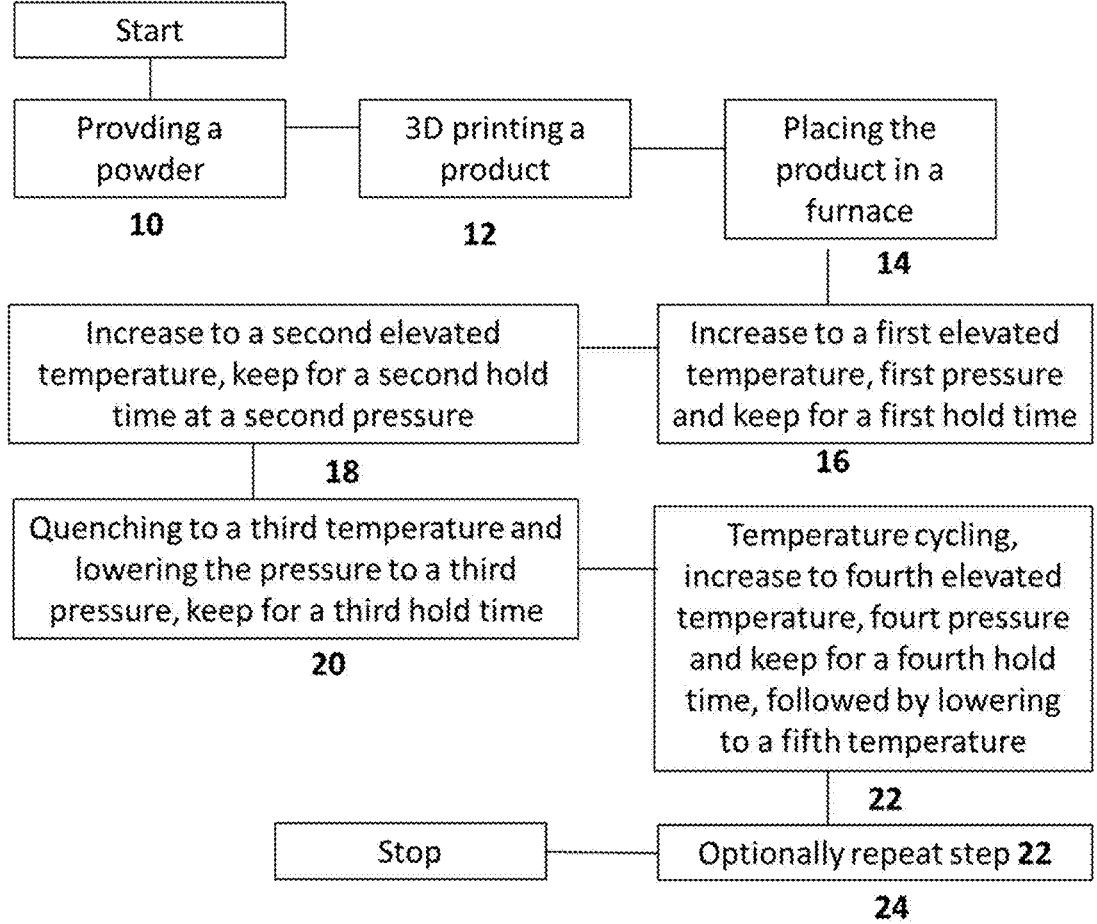
FIG. 11, a schematic illustration of the method according to the present invention.

The present method is schematically shown in FIG. 11.

The present invention also relates to a method of preparing, from an alloy powder, a 3D printed product comprising a combined HIP and hardening process. The alloy is an iron based alloy (Fe balance) further comprising carbon and unavoidable amounts of impurities. The ally may further comprise at least one of chromium, tungsten, cobalt, vanadium and molybdenum. In one preferred embodiment the iron based alloy comprises carbon, chromium, vanadium and molybdenum. In another preferred embodiment the iron based alloy comprises carbon, tungsten, chromium, cobalt, vanadium and molybdenum. In yet another preferred embodiment the iron based alloy comprises carbon, tungsten, chromium, vanadium and molybdenum.

In yet another preferred embodiment the alloy is as defined above. The alloy is based on iron (balance Fe) and comprises carbon and chromium and may further comprise tungsten, cobalt, vanadium, molybdenum and carbon. In one embodiment the alloy is based on iron (balance Fe) and comprises carbon and chromium and wherein the alloy further comprises at least two of the elements tungsten, cobalt, vanadium, and molybdenum. Preferably the alloy has a very low oxygen content, preferably an oxygen content equal to or less than 100 ppm by weight, more preferably less than 50 ppm by weight.

The carbon content of the iron based alloy may be equal to or greater than 0.2 and equal to or less than 5 weight %. In one embodiment the carbon content is equal to or greater than 2.20 and equal to or less than 2.60 weight %. In one preferred embodiment the content is 2.30 to 2.50 weight %. In one embodiment the carbon (C) content is equal to or greater than 1.0 and equal to or less than 5.0 weight %. In one embodiment the content is preferably equal to or greater than 1.4 and equal to or less than 3.0, more preferably 2.20 to 2.60 weight %, more preferably 2.30 to 2.50 weight %.

The chromium content may be equal to or greater than 2 and equal to or less than 30 weight %. In one embodiment the chromium (Cr) content is equal to or greater than 2.0 and equal to or less than 22 weight %. In one preferred embodiment the content is 3.8 to 4.4 weight %, preferably 3.9 to 4.3 weight %. In one preferred embodiment the content is 3 to 10 weight %, preferably 3.5 to 4.5 weight %. In another preferred embodiment the chromium content is 18-22 weight %, more preferably around 20 weight %.

The tungsten (W) content may be equal to or greater than 2 and equal to or less than 25 weight %. In one preferred embodiment the content is equal to or greater than 5 and equal to or less than 13 weight %. In a preferred embodiment the content of tungsten is 4 to 12 weight %. In a more preferred embodiment the content is 6 to 11 weight %. In one embodiment the tungsten (W) content is equal to or greater than 2 and equal to or less than 13 weight %. In one preferred embodiment the content is preferably 6 to 11 weight %.

The cobalt (Co) content may be equal to or greater than 5 and equal to or less than 25 weight %. In one embodiment the content is equal to or greater than 9 and equal to or less than 18 weight %. In a more preferred embodiment the content is 10 to 17 weigh %. In one embodiment the cobalt (Co) content is equal to or greater than 7 and equal to or less than 18 weight %. In one preferred embodiment the content is equal to or greater than 9 and equal to or less than 18. In one embodiment the content is preferably 10 to 17 weight %.

The vanadium (V) content may be equal to or greater than 2 and equal to or less than 15 weight %. In one preferred embodiment the content is equal to or greater than 5 and equal to or less than 8 weight %. In a more preferred embodiment the content is 6 to 7 weight %. In one embodiment the vanadium (V) content is equal to or greater than 3 and equal to or less than 8 weight %. In one embodiment the content is preferably 4 to 7 weight %.

The molybdenum (Mo) content may be equal to or greater than 2 and equal to or less than 20 weight %. In a preferred embodiment the content is equal to or greater than 3 and equal to or less than 10 weight %. In a more preferred embodiment the content is 4 to 8 weigh %, more preferably 5 to 7 weight %. In one embodiment the molybdenum (Mo) content is equal to or greater than 1 and equal to or less than 10 weight %. In one embodiment the content is preferably 2 to 8 weight %, more preferably 5 to 7 weight %.

Besides unavoidable impurities the rest of the alloy is iron i.e. Fe balance. The amount of balanced iron depends on the amount of the other components. Typically, the amount of iron is 50-70 weight %, preferably 60-65 weight %. The oxygen content in the 3D printed product should be as low as possible. In the present invention the oxygen content is preferably 30 ppm or less, or 20 ppm or less.

The alloy may further comprise unavoidable amounts of impurities or traces of impurities of other elements. These elements may be but is not limited to niobium, nickel, manganese, silicon, boron, tantalum, or a combination thereof. The total amount of said other elements or impurities is preferably less than 1 weight %, or less than 0.5 weight %, or less than 0.05 weight %.

In a preferred embodiment the alloy comprises

Carbon: equal to or greater than 1.0 and equal to or less than 5.0 weight %;

Chromium: equal to or greater than 2.0 and equal to or less than 22.0 weight %;

Iron: balance;

wherein the alloy further comprises at least two of the elements:

Tungsten: equal to or greater than 2 and equal to or less than 13 weight %,

Cobalt: equal to or greater than 9 and equal to or less than 18 weight %,

Molybdenum: equal to or greater than 1 and equal to or less than 10 weight %, and Vanadium: equal to or greater than 3 and equal to or less than 8 weight %; and wherein the alloy comprises unavoidable trace amount of impurities.

The oxygen content in the 3D printed product should be as low as possible. Preferably the oxygen content is 30 ppm or less, or 20 ppm or less.

3D Printing

Referring now to FIG. 11. The method uses a free forming apparatus (a 3D-printer) having a chamber in which the powder is arranged. The method of free forming comprises providing a powder of an iron based alloy (step 10) and 3D printing said powder step (step 12). This is done by forming a layer of a powder of an alloy in an oxygen-low environment in the chamber as defined below. The method of 3D printing may be done as described in WO2018/169477 which is hereby incorporated by reference or based on the method described in WO2018/169477. One suitable free forming apparatus is an electron beam apparatus (EBM) from Arcam such as the ARCAM A2X. The alloy comprises carbon, tungsten, molybdenum, chromium, vanadium and cobalt in the amounts described above and the choice of alloy depends on the desired properties of the final product. The content of oxygen and other impurities in the reactor should be as low as possible, such as equal to or less than 10 ppm (corresponding to a gas purity grade 5), or equal to or less than 1 ppm (corresponding to a gas purity grade 6) and the environment in the reactor may comprise inert gases such as argon or helium. The vacuum pressure in the reactor may be $1\text{-}5\times10^{-3}$ mBar or lower, preferably $1\text{-}5\times10^{-4}$ mBar or lower. In one embodiment the initial pressure in the reactor is around $1\text{-}10\times10^{-5}$ mBar ($1\text{-}10\times10^{-3}$ Pa) and then an inert gas such as helium or argon is added to increase the pressure to $1\text{-}5\times10^{-3}$ mBar or lower, or preferably $1\text{-}5\times10^{-4}$ mBar or lower. The powder is then melted locally by exposing the powder to an energy beam during a period of time sufficient to melt it. The energy beam may be a laser beam or an electron beam. The beam is swept across the powder in a pattern. The duration of the sweep may range from milliseconds to minutes depending on the alloy and the size of the particles in the powder. The melted powder is then allowed to at least partly solidify into a multiphase metal alloy. Another layer of powder may then be applied on top of the solidified alloy.

In order to avoid crack formation in the product and for improving the properties of the same, the product is maintained at an elevated temperature (first elevated temperature) during the printing or the formation of the 3D-printed product. Crack formation may be due to a combination of increased internal stresses and increased material brittleness at lower temperatures. The increase in internal stresses is caused by the volume changes at the phase transformations and also ordinary thermal expansion. The elevated temperature to avoid crack formation may be 300° C. or higher, or 400° C. or higher, or 500° C. or higher, or 550° C. or higher, or 600° C. or higher, or 700° C. or higher, or 800° C. or higher, or 900° C. or higher, but usually not higher than 1100° C. For example, the base plate or the working table that the product is built on may comprise a heater. The 3D-printed product may therefore exhibit a temperature gradient within during the building of the product. The heating of the product should be controlled so that the temperature of the built product during the building process is preferably 600° C. or higher, or 700° C. or higher, or 750° C. or higher, but usually 900° C. or lower or 850° C. or lower, or 800° C. or lower. In one embodiment the temperature is 720° C.-790° C. such as 780° C. The temperature should of course be low enough for the melted powder to at least partly solidify before the application of a new powder layer. This allows a lower temperature which not only makes the method cheaper but may also have a positive influence on the microstructure.

In one embodiment the 3D printing comprises the steps of

A. forming a layer of a powder of the iron based alloy on a base plate in the chamber wherein the iron based alloy further comprises carbon and unavoidable amounts of impurities;

wherein the powder comprises substantially spherical particles and/or substantially spherical particles;

B. melting the powder locally by exposing the powder to an energy beam during a sufficient period of time to form a melt pool; and C. letting the melted powder in the melt pool solidify into a multiphase alloy;

D. optionally preparing an additional layer of powder on top of the previous layer by repeating the steps i-iii wherein step ii comprises placing the powder on top of the previous layer;

and wherein the product being built is kept heated at an elevated temperature during the method.

The advantage of using EBM in comparison with laser is that thicker powder layers may be prepared and powders with larger particles may be used. The growth of the carbides occurs during the solidification of the molten material and in order to limit the size of the carbides the growth time should be limited. The solidification time is mainly influenced by the heat diffusion rate, the heat of solidification and the heat diffusion distance. The solidification rate in traditional casting techniques may be enhanced by cooling down the melted material using any suitable technique, such as casting in highly-cooled refractory molds or to cast smaller details. Also, in existing prior art cladding techniques the cooling speed is also high, but not high enough to prevent carbide growth or to receive a fully dense material.

New Combined HIP and Hardening

The obtained 3D printed product is then treated in a combined HIP and hardening process. This may be done using a Quintus machine preferably equipped with Uniform Rapid Quenching (URQ®). In this combined process the 3D printed product is placed in a suitable oven or furnace (step 14). The printed product is heated to a first temperature of at least 850° C. and the pressure is increased to a first pressure of at least 80 MPa. The product is kept at this temperature and pressure for a first hold time (step 16) before the temperature is further increased to a second temperature of at least 950° C. At the second temperature the product is kept for a second hold time (step 18) before rapidly quenched (cooled) to a third temperature and the pressure is also reduced to a third pressure (step 20). The quenching may be done using any suitable means for example gas such as inert gas. In order to obtain better mechanical properties and microstructure the quenching is rapid preferably done at a cooling rate of at least 10° C./s, more preferably 20° C./s, more preferably 30° C./s, more preferably at least 40° C./s, more preferably up to 50° C./s. The product is kept at the third temperature and pressure for a third hold time. After quenching and reduction of the pressure a temperature cycle (tempering) is performed where the temperature is increased to a fourth temperature and where the pressure is increased to a fourth pressure. The product may be kept at the fourth temperature and fourth pressure for a fourth hold time before the temperature is lowered to a fifth temperature. The pressure may also be lowered to a fifth pressure. The temperature cycle may be repeated at least once, preferably twice.

In one embodiment the first temperature is at least 1000° C. but preferably 1200° C. or lower, preferably in the range of 1100° C. to 1200° C., more preferably in the range of 1120° C. to 1150° C.

In one embodiment the second temperature is at least 1050° C. preferably in the range of 1100° C. to 1200° C., more preferably in the range of 1180° C. to 1200° C. Second temperature is higher than the first temperature.

In one embodiment the third temperature is 75° C. or lower. In the quenching step (step 20) the temperature is in one embodiment rapidly quenched from the second temperature to the third temperature of 50° C. or lower and wherein the third pressure is preferably 65 MPa or lower.

In one embodiment the first pressure is less than 210 MPa preferably in the range of 90-120 MPa.

In one embodiment the second pressure is at least 80 MPa, preferably at least 90 MPa, or preferably at least 100 MPa, preferably less than 210 MPa, more preferably less than 150 MPa. In one preferred embodiment the first and the second pressure is the same, i.e. the pressure is not changed in step 18.

In one embodiment the third pressure is in the range of 30-70 MPa, preferably 55-65 MPa.

In one embodiment the fourth pressure is at least 70 MPa preferably in the range of 70-80 MPa more preferably around 75 MPa.

In one embodiment the fourth temperature is in the range of 500-600° C. preferably 550 to 580° C. more preferably around 560° C.

In one embodiment the fifth temperature is 50° C. or lower preferably in the range of 20-25° C.

The hold times are dependent on the alloy composition and the thickness of the product. In one preferred embodiment each hold time is sufficient so that the product obtains the set or aimed temperature or the temperature of the furnace. In one preferred embodiment the first hold time is in the range of 1 to 4 hours preferably 3 hours. In one embodiment the second hold time is in the range of 10 minutes to 60 minutes preferably 30 minutes. In one embodiment the third hold time is in the range of 1 second to 1 hour or from 30 second to 30 minutes. In another embodiment the fourth hold time is in the range of 30 minutes to 3 hours preferably 1 hour.

As is seen in the examples the products according to the present invention or obtained by the method according to the present invention has unexpectedly high hardness and often with remained toughness. This is unexpected in comparison with traditional hardening processes since the alloys treated according to traditional hardening already have been hardened to their "full hardening temperature" according to traditional knowledge. That this effect is achieved for different type steels is also evident when studying and comparing the results from PM-HSS materials (M42, Material 150, 280 and 290) and highly alloyed martensitic stainless steels (Material 350).

Figure 12:
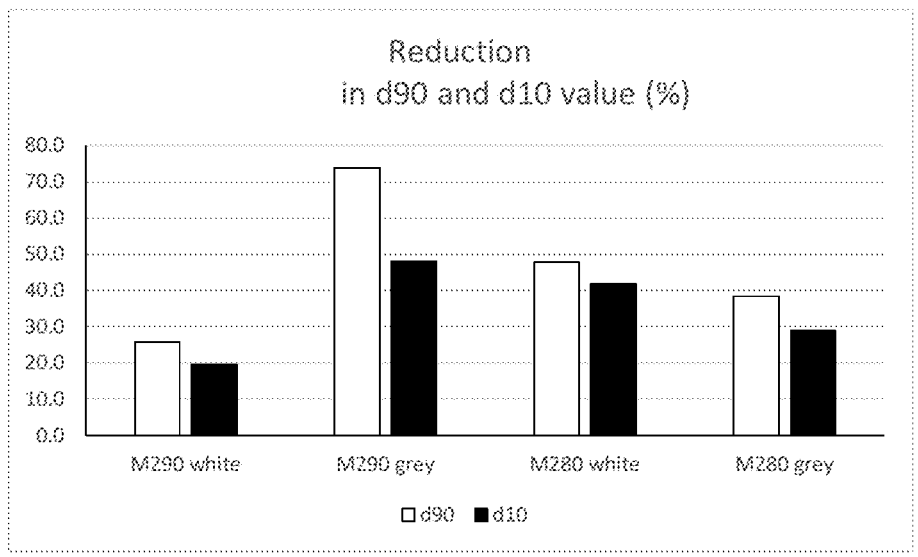
FIG. 12, graph illustrating the lowering of the d90 and d10 values of the carbide area distribution, in percentage, when using the method of the present invention.
Figure 13:
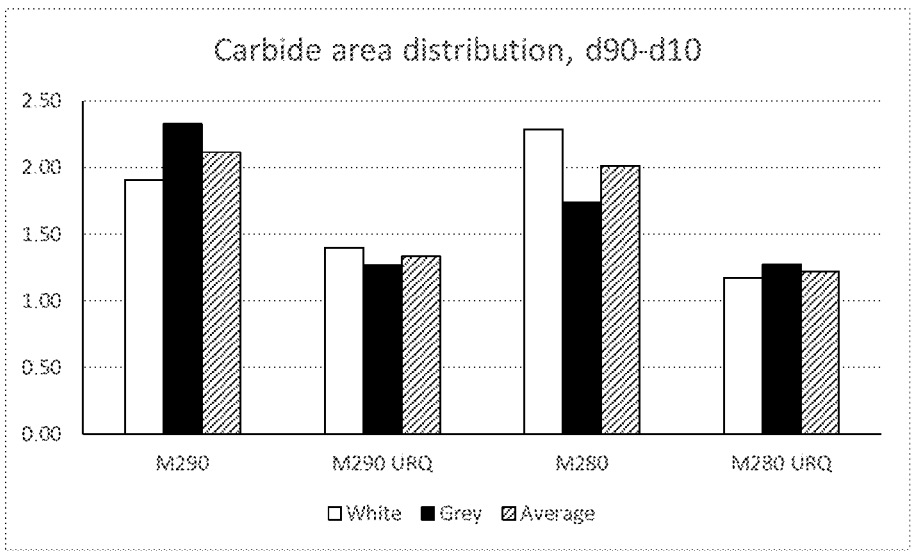
FIG. 13, graph illustrating the carbide area distribution for samples prepared using conventional HIP and heat treatment and samples prepare using the present invention (URQ). The graph shows the difference in d90 and d10 values for white and grey carbides as well as the average value of said differences.
Figure 14:
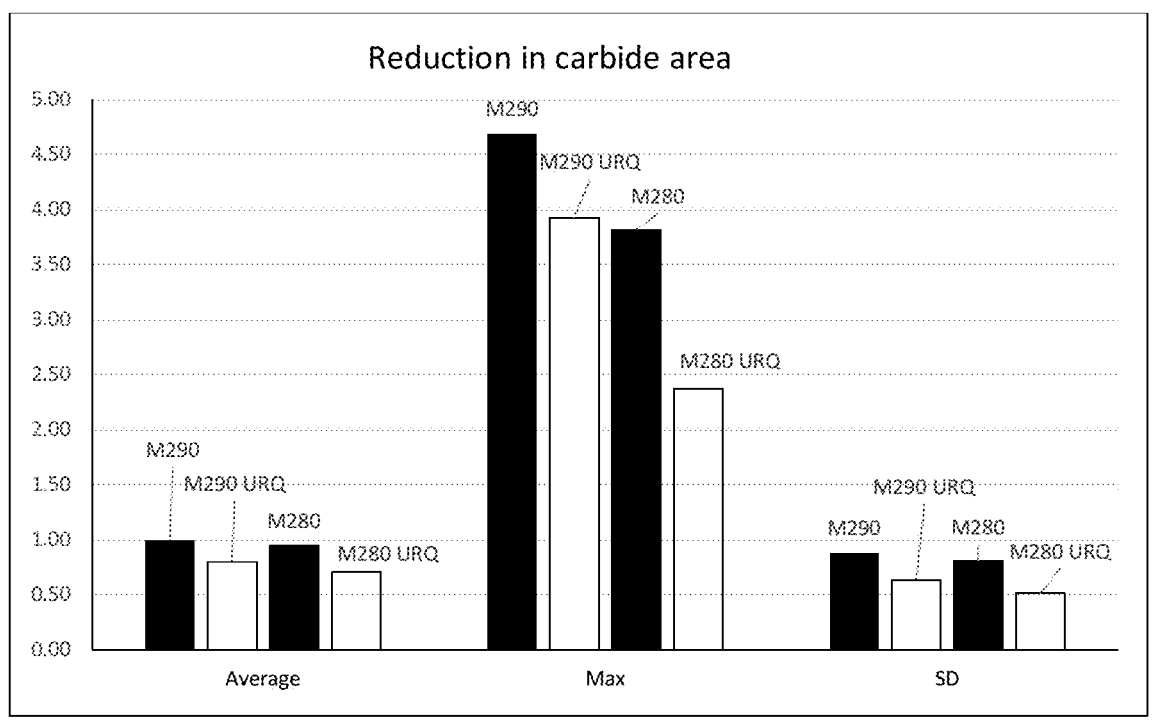
FIG. 14, graph illustrating the carbide area distribution for samples prepared using conventional HIP and heat treatment and samples prepare using the present invention (URQ). Max denotes the maximum carbide area and SD the standard deviation.

Without being bound by theory it is believed that the combined HIP and heat treatment reduces the amount of large carbides. This is for example shown in FIG. 12 where the reduction in d90 value is higher than the reduction in d10 value. FIG. 12-14 clearly shows that the present method results in products having a more narrow carbide area distribution and where the amount large carbides have been reduced in favor of more smaller carbides. The effect on the reduction of area distribution on white carbides as seen in FIG. 13 is also interesting since the white carbides are for example W-carbides.

All the embodiments disclosed herein should be understood as a few illustrative examples of the present invention. It will be understood by those skilled in the art that various modifications, combinations and changes may be made to the embodiments and aspects without departing from the scope of the present invention. In particular, different part solutions in the different embodiments can be combined in other configurations, where technically possible.

EXAMPLES

Example 1

The Quintus QIH 21 URQ machine has been used for comparing separate HIP and hardening and combined HIP and hardening for 3D-printed highly alloyed materials, with compositions as shown in Table 1. Four 3D-printed Fe alloys have been compared, three high speed steel types and one martensitic stainless steel type. The 3D printing was basically performed as described in WO2018/169477 which is hereby incorporated by reference. All four material types have first been conventional consolidated by HIP, hardened and tempering in conventionally manner. Then, samples from exactly the same 3D-printing batches have been treated by the new combined HIP, hardening and tempering process with same hardening and annealing time and temperature settings as traditional. See table 1.

TABLE 1

| Tested 3D-printed materials | | | | | | | |
| --- | --- | --- | --- | --- | --- | --- | --- |
| | Constituting elements (weight %) | | | | | | |
| Material | C | Cr | W | Co | V | Mo | Fe |
| Material 150 | 1.5 | 4.0 | 2.5 | | 4.0 | 2.5 | Bal |
| Material 280 | 2.3 | 4.2 | 6.5 | 10.5 | 6.5 | 7.0 | Bal |
| Material 290 | 2.5 | 4.0 | 11.0 | 16.0 | 6.3 | 5.0 | Bal |
| Material 350 | 1.9 | 20.0 | | | 4.0 | 1.0 | Bal |

The conventional HIP parameters were heating up to 1120-1150° C., hold time 3 h at HIP pressure 100 MPa, and then a cooling down to room temperature with following pressure release.

The conventional hardening was performed in a traditional vacuum furnace, heating up the test details 1180° C., with a hold time of approx. 30 min, followed by a rapid quenching where the cooling speed in the interval 970° C.-800° C. is higher than 7° C./s, and then followed by cooling in air to 25-50° C. Then, the test details were tempered three (3) times, by heating up the details to 560° C., hold time 1 h, then cooled down to 25° C. between the three temperature cycles.

The conventional HIP parameters and hardening+tempering are all standards procedures done at large suppliers.

The new combined HIP, hardening and tempering process according to the present invention use the following parameters: First, the details or products were heated up to 1120-1150° C. during the same time as the pressure is increased up to 100 MPa. At this stage, a hold time of 3 h is maintained, followed by an increase in temperature up to 1180° C. is performed with a new hold time of 30 min. From this stage, a rapid temperature quenching down to 20° C. is done (where the pressure also drops down to 60 MPa). Then, a temperature increase up to 560° C. (followed by an increased pressure up to 75 MPa) is done three times, this is the tempering cycles. The hold time at 560° C. is 1 h each, and the temperature between the temperature cycles were 20° C.

The material samples have then been compared in hardness and in microstructure. The hardness measurements were done by using a 2 kg Vickers indenter on grinded and polished samples by standard material analysis method with final grinding with SiC P4000, according to SS-EN ISO 6507. In this stage, the hardness was measured on several places from the pieces with the same result.

After cutting of samples from the treated material pieces the samples were further treated to facilitate the carbide measurements. This preparation was further polishing by 1 μm diamond in 5 minutes, followed by Struers OP-S solution (40 μm $SiO_2$ at pH 9.8), a well-known method to facilitate carbide structure analysis.

Results

The hardness of all samples is presented in Table 2. In general, the hardness after the combined HIP, hardening and tempering process is surprisingly much higher than for the conventional HIP and heat treatment process. For Material 150 it is 12% higher, for Material 280 it is 11.8% higher, for Material 290 it is 5% higher and for Material 350 it is 12% higher.

TABLE 2

| | Hardness of all test samples (HV2kg) | | | |
| --- | --- | --- | --- | --- |
| Material | Hardness after conventional HIP and conventional heat treatment. | Sample | Hardness after combined HIP and heat treatment | Sample |
| Material 150 | 832 | Mol 17 | 932 | Mol 10 |
| Material 280 | 950 | Mol 15 | 1058 | Mol 11 |
| Material 290 | 1036 | Mol 16 | 1088 | Mol 3 |
| Material 350 | 675 | Mol 14 | 757 | Mol 9 |

The wear resistance was analyzed for a conventional HIP and heat treated Material 280 and the same grade with the new combined HIP and heat treatment.

The test for analyzing the abrasion resistance used is a commercial dimple grinder (Gatan), having a grinding wheel rotating on a horizontal axis pressed onto a sample rotating on a vertical axis. A diamond slurry, average particle size of 2.5 μm, was introduced into the contact before each run. A fixed load of 20 g was applied to the grinding wheel once it contacted the sample. Each test had a duration of 500 wheel rotations which adds up to a total sliding distance of approximately 31 m. For statistical purposes the test was repeated three times per sample.

Cubes of the three test materials were prepared with testing surfaces, approx. 6×6 mm, ground and polished to a surface roughness of Ra-3 μm. The wear rates were given by measuring the removed (abraded) material volume by white light optical profilometry.

The result was a 7.5% lower wear rate for the combined HIP and heat treated grade, despite that they have been hardened at the same max temperature, 1180° C., se FIG. 1.

Carbide Calculations

In the carbide size analysis, a comprehensive microstructural analysis has been performed and corresponding representative microstructures are shown here.

The most important microstructural change is the reduction of carbide (and/or carbide cluster) area and the narrowing of the carbide area distribution, as shown in Table 3. A general trend of much smaller maximum carbides/clusters is revealed but at the same time a larger average carbide area. This suggests that the carbide area distribution is very narrow. This indicates that the toughness of the alloys has been improved or at least not reduced, since the toughness of these types of hard and highly alloyed materials is set by the "largest imperfection" in the materials. These imperfections are typically some kind of contamination, oxide, large carbides or carbide clusters but can also be grinding errors, white layers from too warm grinding. Also the material becomes more homogenous and isotropic with a more narrow carbide distribution.

The microstructure was analyzed in the Scanning Electron Microscope (SEM) as shown in the figures. The SEM was a Zeiss Ultra 55 FEG-SEM, using secondary electron image mode. The primary electron energy (EHT, extra high tension voltage)) was 3, 5 and 10 keV and the aperture used was 30 (standard) or 60 μm. The microstructure of the material showed both surprisingly high carbide content and very fine carbides, FIGS. 2, 4, 6 and 8.

Figure 2:
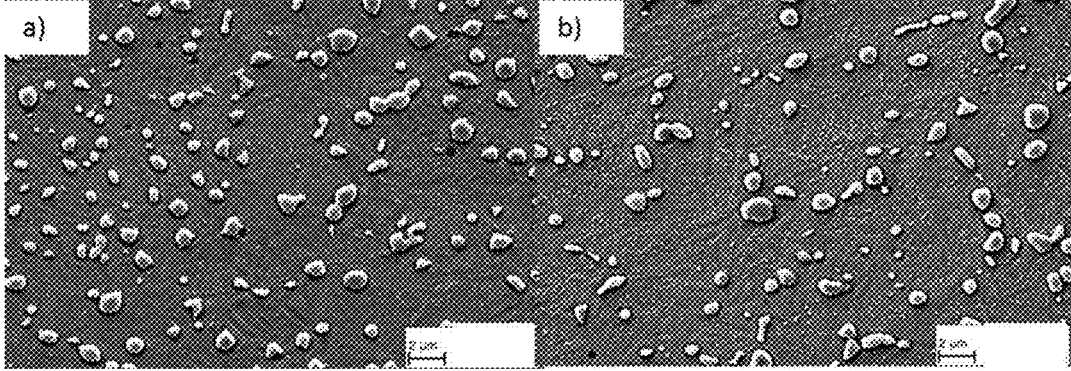
FIG. 2, SEM picture of Material 150 after a) traditional HIP and hardening (WD=7.6 mm, EHT=10.00 kV, Magnification 10.00 KX) and b) after combined HIP and hardening according to the present invention (WD=6.7 mm, EHT=10.00 kV, Magnification 10.00 KX).
Figure 3:
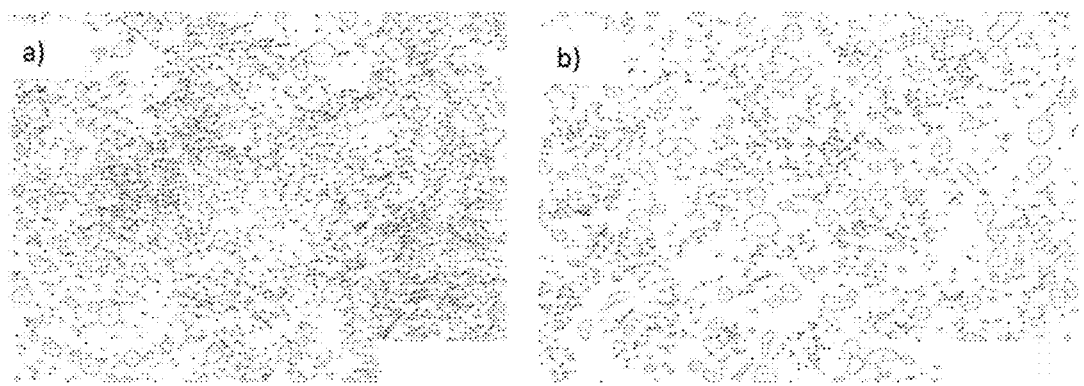
FIG. 3, SEM picture of Material 150 where the edges of the carbides have been marked up after a) traditional HIP and hardening and b) after combined HIP and hardening according to the present invention.
Figure 4:
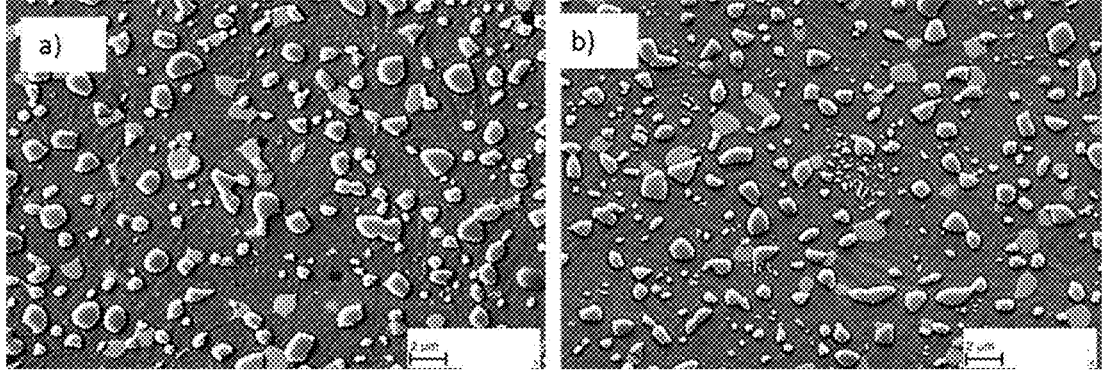
FIG. 4, SEM picture of Material 280 after a) traditional HIP and hardening (WD=7.5 mm, EHT=10.00 kV, Magnification 10.00 KX) and b) after combined HIP and hardening according to the present invention (WD=5.9 mm, EHT=10.00 kV, Magnification 10.00 KX).
Figure 5:
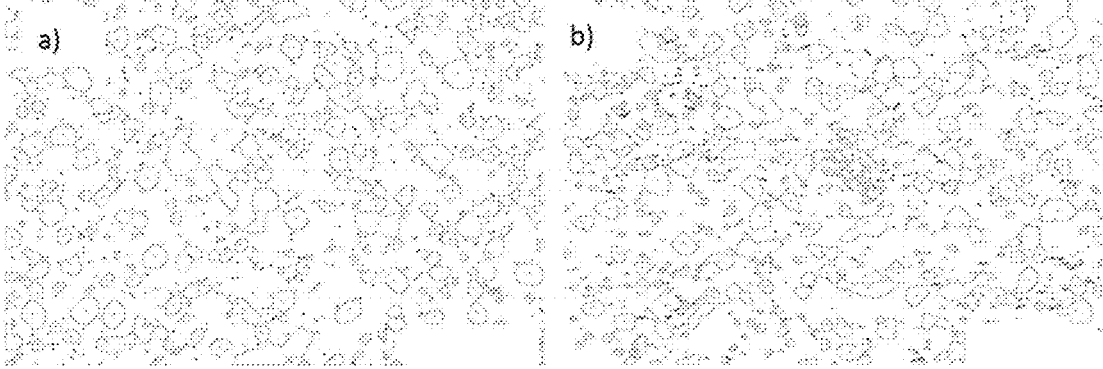
FIG. 5, SEM picture of Material 280 where the edges of the carbides have been marked up after a) traditional HIP and hardening and b) after combined HIP and hardening according to the present invention.
Figure 6:
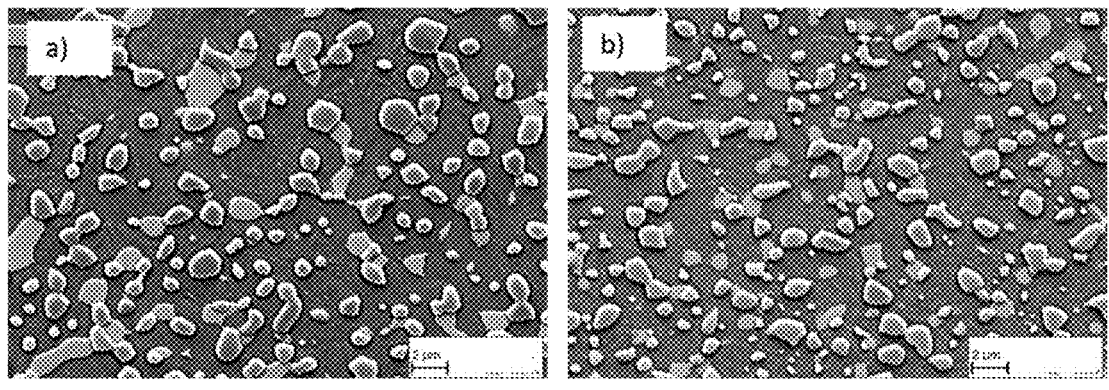
FIG. 6 SEM picture of Material 290 after a) traditional HIP and hardening (WD=6.3 mm, EHT=10.00 kV, Magnification 10.00 KX) and b) after combined HIP and hardening according to the present invention (WD=4.5 mm, EHT=10.00 kV, Magnification 10.00 KX).
Figure 7:
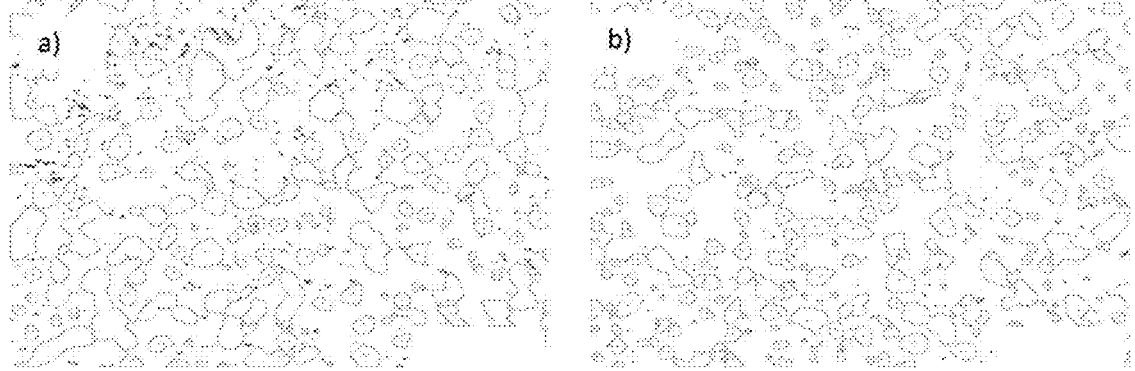
FIG. 7, SEM picture of Material 290 where the edges of the carbides have been marked up after a) traditional HIP and hardening and b) after combined HIP and hardening according to the present invention.
Figure 8:
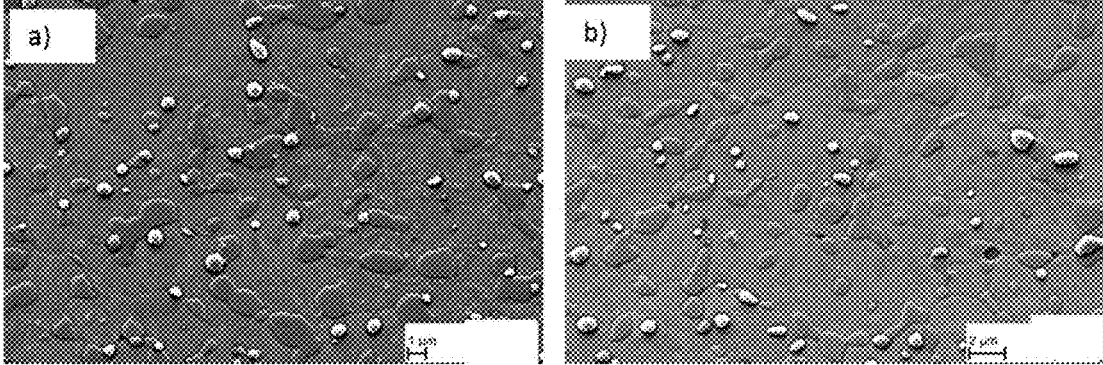
FIG. 8, SEM picture of Material 350 after a) traditional HIP and hardening (WD=4.6 mm, EHT=10.00 kV, Magnification 10.00 KX) and b) after combined HIP and hardening according to the present invention (WD=4.5 mm, EHT=10.00 kV, Magnification 10.00 KX). The larger grey areas are (Cr, V)C carbide types and the small, circular, whiter particles are V,N-rich carbide/nitride types.
Figure 9:
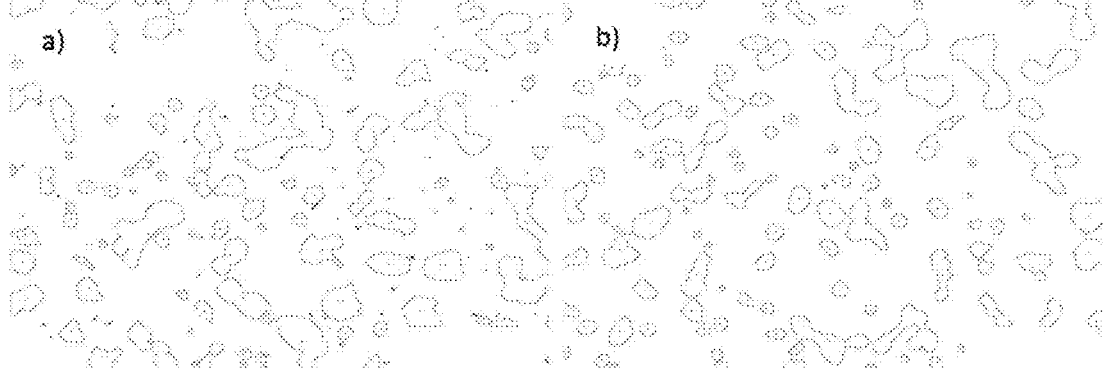
FIG. 9, SEM picture of Material 350 where the edges of the carbides have been marked up after a) traditional HIP and hardening and b) after combined HIP and hardening according to the present invention.

The carbides were calculated by taking the microstructure seen in for example FIG. 2 and marking the borders of single carbides or clusters of carbides and using a suitable software.

The result could be seen in FIGS. 3, 5, 7 and 9. The results of the calculations of the carbide areas and ratios are seen in Table 3.

TABLE 3

Carbide ratios, sizes and diameters based on calculations.

| Material | Sample | Total carbide ratio (% area) | Average Carbide area [μm²] | Maximum carbide/carbide cluster area [μm²] |
|---|---|---|---|---|
| Material 150 | Mol 17* | 13.67 | 0.021 | 2.22 |
| | Mol 10 | 9.7 | 0.027 | 1.97 |
| Material 280 | Mol 15* | 25.33 | 0.15 | 4.49 |
| | Mol 11 | 22.20 | 0.088 | 2.66 |
| Material 290 | Mol 16* | 30.6 | 0.15 | 11.16 |
| | Mol 3 | 27.1 | 0.35 | 4.52 |
| Material 350 | Mol 14* | 21.62 | 0.48 | 8.16 |
| | Mol 9 | 19.11 | 0.97 | 6.28 |

*Conventional HIP and conventional heat treatment

Example 2

Series of tests were conducted on samples to see how the toughness (impact resistance) is affected by the present method in comparison with conventional HIP and heat treatment.

The toughness measurements were done by 3D-printing charpy toughness bars in horizontal and vertical direction, 10 pcs in each direction. After the different tested heat treatments, the bars were grinded to final test bar measurements, L×W×H=7×10×55, +/−0.025 mm. The roughness of the surface is set by the last surface grinding step, grit 4000. No notch is used on the test bars. The toughness is then measured in a 300J Charpy test machine with egg radius 2 mm, at room temperature. The toughness results are presented as an average value of 10 samples, in Joule.

TABLE 4

Hardness and toughness for alloys of the present invention and sample treated according to conventional HIP and heat treatment. Values are given for horizontal lying test samples/vertical standing test samples, which corresponds for fracture in X-Z plane/X-Y plane respectively (where Z is the build direction in the 3D printer).

| Material | Hardness* (HV2Kg) | Hardness (HV2Kg) | Toughness (J)* | Toughness (J) |
|---|---|---|---|---|
| Material 150 | 813/814 | 874/871 | 31.1/13.7 | 26.4/13.4 |
| Material 280 | 941/924 | 993/1014 | 7.9/5.2 | 8.5/4.8 |
| Material 290 | 1011/1015 | 1059/1076 | 5.8/3.3 | 6.0/3.8 |

*Conventional HIP and heat treatment

As presented earlier the hardness of the samples significantly increased when preparing the samples by using the combined HIP and heat treatment according to the present invention. What was unexpected was that the toughness of the samples were more or less the same, an increase in hardness usually comes with a reduction in toughness. FIG. 12-14 disclose the effect on the carbide area distribution for these samples where white and grey carbides refers to how they appear in the SEM, where white carbides typically are formed from heavy metal elements such as W and grey carbides are typically formed from lighter metal elements such as Cr or V, in a number of different stoichiometric types. The carbide area analysis was performed as described above. Two products for each alloy was printed, one in horizontal lying direction and one in vertical standing direction, and the values presented are the average values of the two products.

As seen in FIG. 12 both the d90 and the d10 values are lower when using the present method in comparison with convention HIP and heat treatment. Additionally, FIG. 12 shows that the reduction in the d90 value is higher than the reduction in d10 which indicates that the present method has a more pronounced effect on the reduction of large carbides than on small carbides.

FIG. 13 shows that the carbide area distribution is narrower for sample prepared using the present method (URQ) than conventional HIP and heat treatment. Also the carbide area distribution of white and grey carbides have also become more similar.

FIG. 14 shows that preparing samples using the present invention (URQ) results in smaller carbides (average), smaller maximum carbides (max) and a more narrow distribution (SD, standard deviation).

Example 3

Here print trials of the alloy M42 were compared between two heat treatment methods: traditional 3 h HIP plus hardening in a separate vacuum furnace at 1180° C.+annealing 3×560° C., with the combined HIP and heat treatment according to the present invention using the same temperature and time settings as traditional method above, but with a different pressure.

The powder used was gas atomized with size fraction 53-150 μm having the composition according to spec in wt %:

| C | Cr | Mo | W | Co | V |
|---|---|---|---|---|---|
| 1.08 | 3.8 | 9.4 | 1.5 | 8.0 | 1.2 |

The M42 is a very high Mo steel, normally a traditional non-PM High-Speed-Steel material, according to standard HS 2-9-1-8, AISIS M42 or EN 1.3247.

The combined HIP and heat treatment was conducted as described above at these conditions:

3 h HIP at 1120° C. and at 1000 Bar
Increased temperature to 1180° C.
Quenching/hardening
Annealing at 3×1 h at 560° C. at approximately 500 Bar
The traditional HIP and heat treatments were done at:
3 h Hipped at 1120-1150° C. and at 1000 Bar in a separate HIP furnace
Cooled to room temp
Shipped to a hardening company
Hardened at 1180° C.
Annealed at 3×1 h at 560° C.

In the material specification for this material (as traditional bars) can be hardened from 61 HRC up to 68 HRC (Rockwell), where the latter is achieved with hardening temperature 1190° C.+3×1 h at 560° C. If hardening at 1180° C., the hardness is approximately 67.6 HRC. Austenitizing occur at 1050-1090° C. (Erasteel material specification data).

Hardness and toughness were determined as described above.

Results

Table 5. Carbide area of printed M42 samples treated by conventional HIP and heat treatment and the combined HIP and heat treatment according to the present invention. SD denotes standard deviation.

| Carbide area [μm2] | | | | |
|---|---|---|---|---|
| Sample | Average | Max. area | Min.area | SD |
| M42*S | 0.218 | 5.913 | 6.93E−04 | 0.63 |
| M42*L | 0.203 | 8.233 | 6.93E−04 | 0.656 |
| M42S | 0.393 | 4.382 | 6.93E−04 | 0.604 |
| M42L | 0.417 | 9.448 | 6.93E−04 | 0.788 |

*Conventional HIP and heat treatment

The traditional hardened sample had 945+/−68 HV2 kg while the samples obtained by the combined HIP and heat treatment had hardness of 1020+/−69 HV2 kg This means that the hardness increased 8% by the present method.

The toughness for samples of the combined HIP and heat treatment was 13-21% lower than traditionally treated samples. Without being bound by theory this is believed to be a consequence of the low carbon content which in turn means that the effect of the combined HIP and heat treatment is not fully achieved.

The invention claimed is:

1. A 3D-printed product made of an iron based alloy comprising a metal matrix and grains of carbides embedded in the metal matrix;

wherein the alloy comprises

Carbon: equal to or greater than 1.4 and equal to or less than 5.0 weight %;

Chromium: equal to or greater than 2.0 and equal to or less than 22.0 weight %;

Iron: balance;

wherein the alloy further comprises at least two of the elements:

Tungsten: equal to or greater than 2 and equal to or less than 13 weight %,

Cobalt: equal to or greater than 7 and equal to or less than 18 weight %,

Molybdenum: equal to or greater than 1 and equal to or less than 10 weight %, and Vanadium: equal to or greater than 3 and equal to or less than 8 weight %; and wherein the alloy comprises unavoidable trace amount of impurities; and wherein the maximum carbide area is less than 8 μm² and wherein the average carbide area is less than 2 μm²; and wherein the carbide area distribution has a difference between the d90 value and d10 value of not more than 1.90 μm² and/or has a d90 value of not more than 2.20 μm²;

wherein the oxygen content in the 3D-printed product is 30 ppm or less; and wherein the alloy has a toughness of at least 3.8 J and a hardness of at least 871 HV2 kg.

2. The 3D-printed product according to claim 1, wherein the carbon content is equal to or greater than 1.4 and equal to or less than 3.0 weight %.

3. The 3D-printed product according to claim 1, wherein the alloy further comprises:

Tungsten: equal to or greater than 2 and equal to or less than 13 weight %,

Molybdenum: equal to or greater than 1 and equal to or less than 10 weight %,

Vanadium: equal to or greater than 3 and equal to or less than 8 weight %; and optionally Cobalt: equal to or greater than 9 and equal to or less than 18 weight %.

4. The 3D-printed product according to claim 1, wherein the alloy comprises:

Carbon: equal to or greater than 1.4 and equal to or less than 3.0 weight %;

Chromium: equal to or greater than 2.0 and equal to or less than 22.0 weight %;

Molybdenum: equal to or greater than 1 and equal to or less than 10 weight %, and Vanadium: equal to or greater than 3 and equal to or less than 8 weight %;

Iron: balance; and wherein the alloy comprises unavoidable trace amount of impurities.

5. The 3D-printed product according to claim 1, wherein the alloy comprises:

Carbon: equal to or greater than 2.20 and equal to or less than 2.60 weight %,

Tungsten: equal to or greater than 5 and equal to or less than 13 weight %,

Chromium: equal to or greater than 3.5 and equal to or less than 4.5 weight %,

Cobalt: equal to or greater than 9 and equal to or less than 18 weight %;

Molybdenum: equal to or greater than 3 and equal to or less than 10 weight %;

Vanadium: equal to or greater than 5 and equal to or less than 8 weight %;

Iron: balance; and unavoidable trace amount of impurities; or wherein the iron based alloy comprises:

Carbon: equal to or greater than 2.25 and equal to or less than 2.40 weight %,

Tungsten: equal to or greater than 6 and equal to or less than 8 weight %,

Chromium: equal to or greater than 3.5 and equal to or less than 4.5 weight %

Cobalt: equal to or greater than 9 and equal to or less than 12 weight %;

Molybdenum: equal to or greater than 5 and equal to or less than 8 weight %;

Vanadium: equal to or greater than 5 and equal to or less than 8 weight %;

Iron: balance; or wherein the iron based alloy comprises:

Carbon: equal to or greater than 1.2 and equal to or less than 1.8 weight %,

Chromium: equal to or greater than 3.5 and equal to or less than 4.5 weight %

Tungsten: equal to or greater than 2.0 and equal to or less than 4.0 weight %,

Vanadium: equal to or greater than 3 and equal to or less than 5 weight %;

Molybdenum: equal to or greater than 1 and equal to or less than 4 weight %;

Iron: balance; or wherein the iron based alloy comprises:

Carbon: equal to or greater than 1.5 and equal to or less than 2.3 weight %;

Chromium: equal to or greater than 17 and equal to or less than 22.0 weight %;

Vanadium: equal to or greater than 3 and equal to or less than 5 weight %;

Molybdenum: equal to or greater than 1 and equal to or less than 3 weight %;

Iron: balance; or wherein the iron based alloy comprises:

Carbon: equal to or greater than 1.0 and equal to or less than 1.20 weight %,

Chromium: equal to or greater than 2.0 and equal to or less than 5.0 weight %;

Molybdenum: equal to or greater than 7 and equal to or less than 10 weight %;

Cobalt: equal to or greater than 7 and equal to or less than 9 weight %;

Tungsten: equal to or greater than 1.0 and equal to or less than 3.0 weight %;

Vanadium: equal to or greater than 1.0 and equal to or less than 3.0 weight %;

Iron: balance.

6. The 3D-printed product according to claim 1, wherein the average carbide area is less than 1 $\mu m^2$.

7. The 3D-printed product according to claim 1, wherein the maximum carbide area is 4 $\mu m^2$ or less.

8. The product according to claim 1, wherein the product is a milling cutter, a shaper cutter, a power skiving cutter, a drill, a milling tool, an extrusion head, a wire drawing die, a hot rolling roll or a gliding or roll bearing ring.

* * * * *